(12) United States Patent
Goldspink et al.

(10) Patent No.: US 9,546,512 B2
(45) Date of Patent: *Jan. 17, 2017

(54) CLOSURE FOR A COMPARTMENT

(71) Applicant: Telezygology, Inc., Chicago, IL (US)

(72) Inventors: Lachlan Richard Goldspink, Elizabeth Bay (AU); Dickory Rudduck

(73) Assignee: Telezygology, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/709,007

(22) Filed: Dec. 9, 2012

(65) Prior Publication Data
US 2014/0040115 A1 Feb. 6, 2014

Related U.S. Application Data

(63) Continuation of application No. 12/972,739, filed on Dec. 20, 2010, now Pat. No. 8,360,307, which is a
(Continued)

(30) Foreign Application Priority Data

Mar. 17, 2003 (AU) ................................ 2003901194
Mar. 17, 2004 (WO) ................. PCT/AU2004/000319

(51) Int. Cl.
*E05F 15/76* (2015.01)
*E05F 15/20* (2006.01)
(Continued)

(52) U.S. Cl.
CPC ....... *E05F 15/2076* (2013.01); *A47G 29/1201* (2013.01); *A47G 29/124* (2013.01);
(Continued)

(58) Field of Classification Search
CPC ............ A47G 29/1201; A47G 29/1214; A47G 29/122; A47G 29/1225; A47G 29/124; A47G 29/141; A47G 29/16; A47G 29/30; A47G 2029/12; A47G 2029/122; A47G 2029/1225; A47G 2029/1226; A47G 2029/141–2029/149; G08B 13/08; G07C 9/00912; G07C 2209/62; E05G 1/04; E05B 41/00; E05B 47/0009; E05B 65/025; Y10T 24/45482; Y10T 70/7062; E05F 15/76; E05F 15/77; G06Q 20/10
(Continued)

(56) References Cited

U.S. PATENT DOCUMENTS 5,108,214 A * 4/1992 Milam ............................. 403/28
5,774,053 A * 6/1998 Porter ......................... 340/568.1
(Continued)

*Primary Examiner* — William Miller
(74) *Attorney, Agent, or Firm* — Kartsounes Law, LLC

(57) ABSTRACT

The invention provides a closures (106) for a compartment (100) having one or more walls (112, 114, 116, 118) and an opening (110) defined by at least one of the walls (112, 114, 116, 118). The closure (106) is associated with at least one fastener located inside the compartment (100). The fastener can hold the closure (106) in a first position (eg. closed) relative to the opening (110). The fastener is adapted to cause the closure (106) to assume a second position (eg. open) relative to the opening (110) upon receipt of a suitable signal. The closure (106) has at least one indicium (108) visible from outside the compartment (110). The indicium (108) is adapted to provide a visual indication of a status of the closure (106) or the compartment (110), such as closure open, closure closed, compartment empty, compartment occupied. Instead of indicium (108) or in addition to it, the closure of the invention can include in the fastener means for communicating to a remote device, a status of the closure or the compartment. The closure and the compartment may form an array with other closures and compartments having similar fasteners. In that event, the fastener in each compartment may be addressable.

22 Claims, 6 Drawing Sheets

Related U.S. Application Data continuation of application No. 10/549,485, filed as application No. PCT/AU2004/000319 on Mar. 17, 2004, now Pat. No. 7,878,389.

(51) Int. Cl.
| | |
|---|---|
| A47G 29/12 | (2006.01) |
| A47G 29/122 | (2006.01) |
| A47G 29/124 | (2006.01) |
| E05B 41/00 | (2006.01) |
| E05B 47/00 | (2006.01) |
| G06Q 20/10 | (2012.01) |
| E05F 15/77 | (2015.01) |
| E05B 65/02 | (2006.01) |
| G07C 9/00 | (2006.01) |

(52) U.S. Cl.
CPC .......... *A47G 29/1225* (2013.01); *E05B 41/00* (2013.01); *E05B 47/0009* (2013.01); *E05F 15/77* (2015.01); *G06Q 20/10* (2013.01); *A47G 2029/1226* (2013.01); *E05B 65/025* (2013.01); *E05Y 2900/60* (2013.01); *G07C 9/00912* (2013.01); *G07C 2209/62* (2013.01); *Y10T 24/45482* (2015.01); *Y10T 70/7062* (2015.04)

(58) Field of Classification Search
USPC ......... 232/34–36, 19, 17, 44; 70/277, 278.1, 70/280; 340/569, 568.1, 825.31, 545.6; 200/61.63; 109/38, 43; 24/606
See application file for complete search history.

(56) References Cited

U.S. PATENT DOCUMENTS

| | | | | |
|---|---|---|---|---|
| 5,850,967 | A | * | 12/1998 | White .............................. 232/17 |
| 6,028,517 | A | * | 2/2000 | Sansone et al. .............. 340/569 |
| 6,483,433 | B2 | * | 11/2002 | Moskowitz et al. ........ 340/568.1 |
| 6,995,674 | B2 | * | 2/2006 | Turner et al. .............. 340/572.8 |
| 7,256,691 | B2 | * | 8/2007 | Awobue ...................... 340/545.6 |
| 7,337,944 | B2 | * | 3/2008 | Devar .............................. 232/19 |
| 2001/0045449 | A1 | * | 11/2001 | Shannon ......................... 232/19 |
| 2005/0172462 | A1 | * | 8/2005 | Rudduck et al. ............... 24/606 |

* cited by examiner

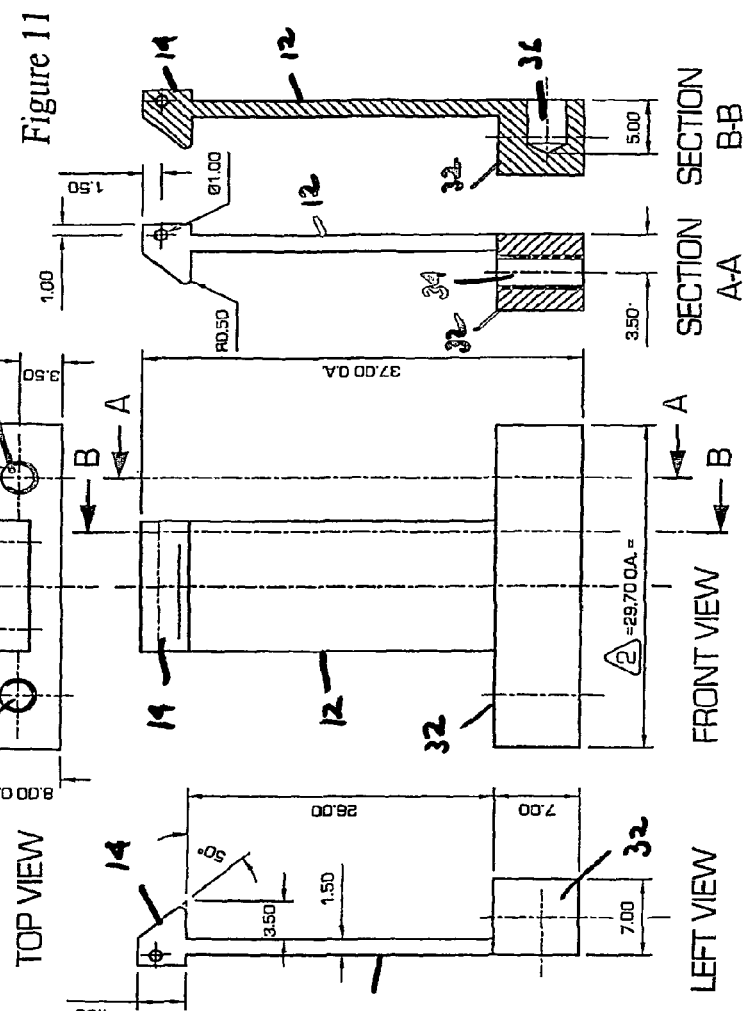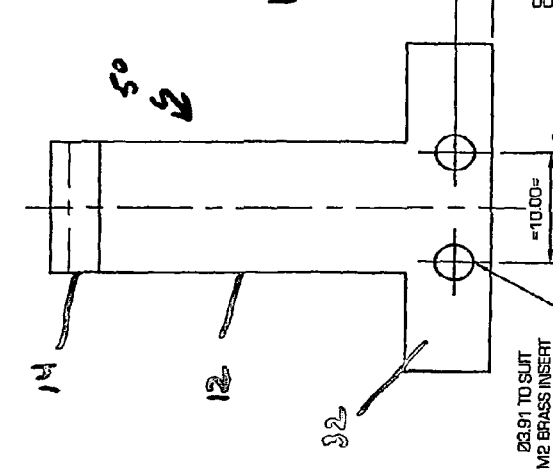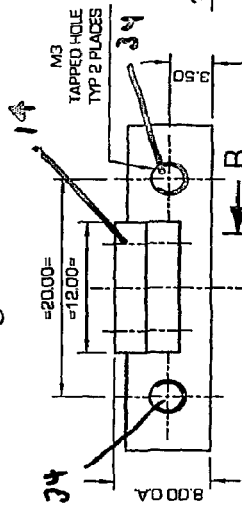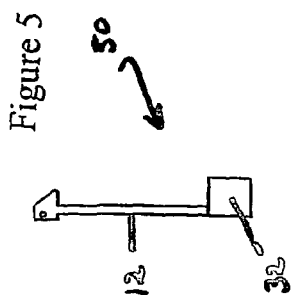

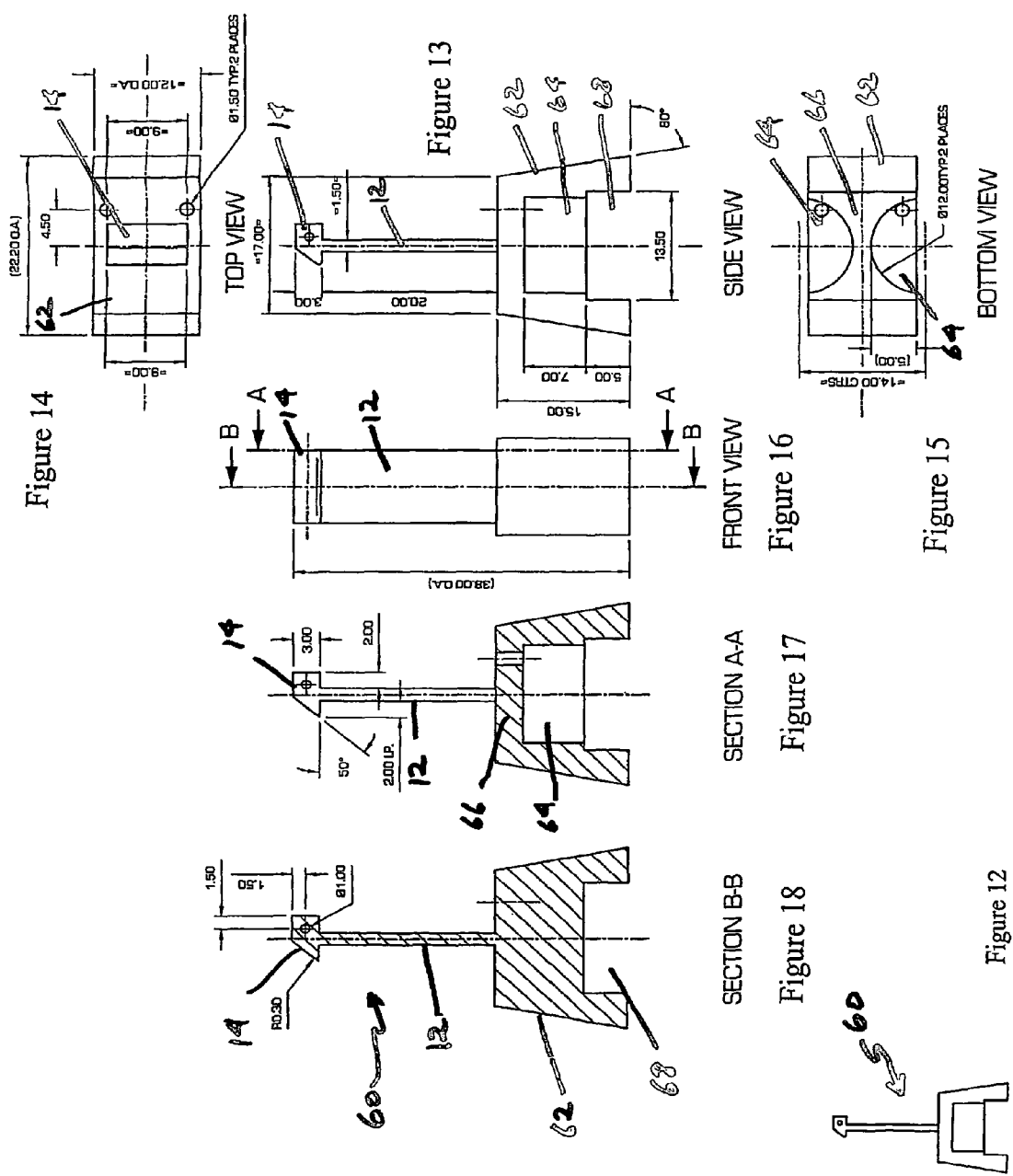

US 9,546,512 B2

CLOSURE FOR A COMPARTMENT

CROSS REFERENCE TO RELATED APPLICATIONS

This application is a continuation application of U.S. application Ser. No. 12/972,739 filed on Dec. 20, 2010 (now U.S. Pat. No. 8,360,307) which is a continuation of U.S. application Ser. No. 10/549,485 filed on Sep. 15, 2005 (now U.S. Pat. No. 7,878,389) which is the National Stage (35 U.S.C. 371) entry of PCT Application No. PCT/AU2004/000319 filed on Mar. 17, 2004.

TECHNICAL FIELD

This invention relates to a closure for a compartment.

The invention may be suitable for a wide range of compartment closures. Suitable compartments may be mail boxes (letter boxes) and lockers. The invention is not limited to these compartments. However, for convenience of description, the disclosure below will focus on mail boxes and lockers. Again for convenience, the description below will refer to multiple mail boxes and lockers. It is to be understood that the invention is not necessarily limited to this and that the invention may also be useful for stand alone mail boxers and lockers.

BACKGROUND

Arrays of private mail boxes are often made available for hire by postal authorities and by private organisations. Such mail boxes are operated by keys. A hirer will normally pay a fee for use of a private mail box and will be provided with the key appropriate for the mail box hired. Hiring fees are normally based on periods of time—for example, six months. Mail box keys are often lost by the person hiring the mail box and it is normal to require a deposit for the key.

It is an object of this invention, at least in some embodiments, to provide a system in which there is no need for a keyed lock for each mail box in an array of mail boxes. It is a further object of the invention, at least in some embodiments, to dispense with the need for a traditional key to each mail box. In some embodiments in the invention, the means for gaining access to a mail box can be linked with financial accounting for use of the mail box.

An array of mail boxes is commonly installed in other situations, for example, in the foyer of an office building or in the foyer of a condominium (home unit) building. Once again, until now each such mail box has normally required an individual lock and a key to operate that lock. As in the case with private mail boxes, discussed above, it is an object of this invention, in some embodiments, to eliminate the need for a traditional keyed lock for each mail box. Optionally, this invention can provide means for access to an individual mail box which is the same as or combined with means of access to a door in the office building or condominium building. That door may be the main door into the building, in the case of a security complex, or the door to the individual office or condominium in the building.

Lockers are provided in arrays, similar to mail boxes. For example, an array of lockers may be provided at an airport or a shopping centre for temporary use. Like mail boxes, such lockers have normally been "hired" by a user by inserting coins into a mechanism provided on each locker. This will normally permit the user to lock the locker and remove the key. Such lockers require not only the coin-freed mechanism but also individual keyed locks, with appropriate keys. Using an appropriate embodiment of the present invention, it is possible to avoid the need for individual coin-freed mechanisms of the type described and the need for individual traditional locks and keys for each locker.

In gymnasia and clubs, lockers are often provided for the use of members and visitors. Sometimes these are provided for a set charge and sometimes they are provided free. In either case, until now, each locker has required a keyed lock and a key for that lock. Using an appropriate embodiment of the present invention, such individual keyed locks and keys can be eliminated.

As will be described below, in some embodiments of the invention it is possible to provide communication from the mailbox or locker and/or indicia indicating a status of the mailbox or locker. As an example of communication, a mailbox incorporating an embodiment of the invention may be able to communicate to a user whether the mailbox contains mail, whether the mailbox has been opened by an authorised user or whether the mailbox has been tampered with. In an even more sophisticated version, the mailbox may be able to communicate the type of mail in the box. A locker may be able to communicate similarly, if so desired.

The communication may be to the principal user of the mailbox or to another party, for example, a courier. At present, couriers normally require a written acknowledgment of receipt of a courier delivery. This means that the courier will usually have to enter a building, find an authorised person and have that authorised person acknowledge receipt of the delivery. In some embodiments of the invention, it is possible for the compartment, such as a mailbox, to provide acknowledgment of delivery of an article into the mailbox. Communication can be directly to a party accessing the mailbox or to a remote centre.

As an example of indicia, a mailbox may display various signals, for example, a signal that the mailbox is closed, a signal that the mailbox is open and a signal that the mailbox contains mail. A locker may similarly exhibit a signal that it is open or closed and that it is either empty or contains contents.

SUMMARY OF THE INVENTION

In one aspect, this invention provides a closure for a compartment having one or more walls and an opening defined by at least one of the walls, the closure being associated with at least one fastener located inside the compartment and adapted to hold the closure in a first position relative to the opening, the fastener being adapted to cause the closure to assume a second position relative to the opening upon receipt of a suitable signal, wherein the closure includes at least one indicium visible from outside the compartment and adapted to provide a visual indication of a status of the closure or the compartment.

In a second aspect, the invention provides a closure for a compartment having one or more walls and an opening defined by at least one of the walls, the closure being associated with at least one fastener located inside the compartment and adapted to hold the closure in a first position relative to the opening, the fastener being adapted to cause the closure to assume a second position relative to the opening upon receipt of a suitable signal, wherein the fastener includes means for communicating to a remote device information relating to the closure, the compartment or contents of the compartment.

In a third aspect, the invention provides a closure for a compartment having one or more walls and an opening defined by at least one of the walls, the closure being associated with at least one fastener located inside the compartment and adapted to hold the closure in a first position relative to the opening, the fastener being adapted to cause the closure to assume a second position relative to the opening upon receipt of a suitable signal, wherein the compartment forms an array with other compartments having similar fasteners, the first-mentioned fastener is addressable and the signal is provided by means external to the compartment and capable of addressing the first-mentioned fastener.

The invention includes any combination of the first, second and third aspects of the invention.

Further, the invention provides a compartment having such a closure, as well as an array of such compartments.

The compartment is preferably a mailbox or locker, but the invention is not limited to these options. In the case of a mailbox, the compartment may have a single opening, being that defined by at least one of the walls. Commonly, a mailbox compartment will be square or rectangular in cross section and the opening will be defined by four of the walls. A mailbox compartment may be closed by a wall located opposite the opening. Alternately, the mail box compartment may be open at that location. This enables mail workers to have access to the internal end of the compartment, for easy deposit of mail.

When the compartment is a locker this will normally be closed on all sides except for the opening which is closed by the closure of the invention.

The compartment is not limited to any particular shape. For example, it may be circular in cross section, in which case the opening may be defined by a single, continuous wall.

The closure should be shaped to adequately close the opening and will normally take the form of the cross-sectional shape of the compartment. However, it is not necessary that the closure completely seals off the compartment. For example, when the compartment is a mail box, a letter slot may be provided at one end of or though the closure. In other cases, it will be desirable that the closure does provide an adequate seal.

The closure is preferably hinged or otherwise attached to the compartment at the opening. Preferably, in the first position the closure closes the opening. It is further preferred that this is the "at rest" position and that no energy is required to maintain this configuration. The nature of the fastener (refer description below) will in may cases determine if the closure is at rest in the closed position.

The second position is preferably the "open" configuration and it is preferred that this is achieved upon the application of energy via the signal.

The fastener may take any appropriate form. While not limiting the nature of the fastener, it is preferred that the fastener is one of those disclosed or to be disclosed by Telezygology Pty Limited or Telezygology Inc in patent specifications. Reference is made to the following patent specifications, the contents of which are hereby imported by reference: International Patent Application No. PCT/AU99/00185, International Patent Application No. PCT/AU03/00759. International Patent Application No. PCT/AU03/00933 and Australian Provisional Patent Application No. 2003901352.

An example of one such fastener includes a fastening element having a flexible beam and an engagement means; and actuating means attached to the fastening element and including a material adapted to contract when activated; the beam being moveable, upon contraction of the material, between an engagement position and a disengagement position. Preferably, the material adapted to contract when activated is chosen from the group; shape memory wire; shape memory strip and shape memory alloy in sputter form.

Such a fastener may be an overhang fastener which includes a shape memory material adapted to assume a first position in which the fastener holds the closure in the first position relative to the opening and a second position in which the fastener causes the closure to assume the second position relative to the opening. In this example, the shape memory material is activated to assume its second position upon the application of suitable energy provided by the signal.

Shape memory materials are known. Currently, the best known of these is a shape memory alloy, predominantly or wholly made of titanium and nickel, but which may also include other material, such as aluminium, zinc and copper. Such a shape memory alloy is capable of changing shape at a predetermined transition temperature. Some shape memory alloys adopt one shape below the predetermined transition temperature and change to a second shape once the temperature exceeds the transition temperature. Usually, when a shape memory alloy cools below the transition temperature, it is capable of adopting the first shape again.

In the embodiment where the fastener is an overhang fastener, it preferably includes shape memory alloy in the form of a titanium-nickel wire. When sufficient energy in the form of an electrical current is applied, this wire heats to or above a temperature at which the material shrinks by about 4-5 percent. Since the fastener is in the form of an overhang hook, once the material shrinks to the desired extent, the hook can be caused to bend away from the configuration in which the closure is held in closed relationship to the opening. Once the electrical current ceases, the alloy can cool below the transitional temperature and can assume its original configuration, causing the closure to close the opening.

In the simplest form of this embodiment of the fastener, the signal causes the electric current to heat the shape memory alloy sufficiently to contract the shape memory material, lifting the hook away from engagement with a shank or a ledge or other suitable part of the closure or compartment. This releases the closure which can be pulled open by hand, especially if the closure is hinged at or toward its top. If the closure is hinged at or towards its bottom, release by the fastener may permit the closure to fall open under the influence of gravity. In either case, to close the closure, it may be necessary merely to push the closure into the closed position. Assuming that the electrical current has ceased and the shape memory material has elongated to its original position, the fastener may be designed to "click" back into the locked position when the closure is pressed against the opening.

In a variation of this embodiment of the fastener, it may be desired to maintain the shape memory material in the contracted position for a desired length of time. This can be carried out by using less energy (such as an electrical current) than that required to change the shape memory material to the contracted configuration in the first place. For example, an insulating tube may be maintained around the shape memory material, the tube comprising or including Teflon or other insulation, for example.

The two variations referred to above may be regarding as monostable. In the case of a monostable fastener, the fastener may take the form of a titanium-nickel wire joined to a resilient material. When the wire is heated to a sufficient temperature, shrinkage occurs and the resilient material bends to accommodate the shrinkage. When the wire cools below the relevant temperature, it elongates. The bias of the resilient material causes the monostable fastener to resume the original position.

In a further variation of this embodiment of the fastener, the fastener can be bistable. In this variation, there are two pieces of the titanium-nickel wire in the fastener. Each can be separately activated by an electrical current. When the first wire is activated, is shrinks and distorts the fastener in the desired way. This configuration is designed to lack any bias urging the first wire into the original position when it cools. Consequently, when the first wire cools, the fastener stays in the second position. In order to restore the fastener to the first position, it is necessary to activate the second wire by the application of suitable heat (for example by electricity), so that it shrinks and draws the fastener back to the first position.

The choice of variation of fastener may depend on the environment and use of the compartment.

The overhang fastener in this embodiment, regardless of the variation selected, may be a discrete overhang fastener or a linearly extended overhang fastener. In the case of the discrete overhang fastener, terminals in the base of the fastener may be used to connect to a electrical supply. In the case of the linear form of overhang fastener, one or more buses may be incorporated in the fastener in order to transmit electrical energy throughout the length of the liner overhang fastener. A metal wire lashing may connect one bus to another along the length of the fastener. The lashing may be integrated with the fastener.

As an another example, the fastener may be a fastener assembly for releaseably securing an element, the element including a post having a groove, the assembly including a bar adapted to engage the groove to secure the element, the assembly also including a connecting means attached to the bar and consisting of or including shape memory material which, upon application of suitable energy, is adapted to change shape and draw the bar out of engagement with the groove, thus releasing the element.

Preferably, the element has more than one post, each having a groove. The bar may engage the groove in more than post. Preferably, the bar engages the groove in each of two posts.

Regardless of the type of fastener selected, there may be one or more fasteners per compartment. In the case of a fastener such as the discrete overhang fastener described above, preferably at least two fasteners are used, for security reasons. If the linearly extended overhang fastener referred to above is used, only one fastener may be preferred, depending on the length of the fastener.

Each fastener is preferably located on the closure, but may instead be located on a wall of the compartment, for example.

When there is more than one fastener associated with a closure, only one fastener need be addressable in relation to the third aspect of the invention. The other fastener or fasteners may be "slave" fasteners.

Fasteners may be encrypted for added security.

In relation to the first aspect of the present invention, the closure includes at least one indicium visible from outside the compartment and adapted to provide a visual indication of a status of the closure or the compartment. The indicium may show whether the compartment has a closed or an open status. It may show whether there is anything in the compartment. For example, when the compartment is a mail box, the indicium may show whether there is mail in the mail box. When the compartment is a locker, the indicium may show whether there are any clothes or other contents in the compartment.

The indicium may take the form of light emitting diode (LED) chips. For example, the indicium may comprise a red, a green and a blue LED set into the closure panel so as to be capable of emitting an appropriate coloured light visible from outside the compartment. The LEDs are preferably linked to the fastener. When the fastener is holding the closure in the first position, for example, the closed position, there may be no light or the green LED may be lit. When the fastener has caused the closure to assume the second position, for example, open so as to expose the opening, the red LED may be lit. If the fastener is capable of sensing contents of the compartment and senses that the compartment is not empty, the blue LED may be lit. Thus, an external inspection of the compartment can readily indicate status. When the green light shows, the user knows that the compartment is safely closed. When the red light shows, the user is warned that it is open and is alerted to inadvertently leaving the compartment unlocked. When the blue light shows, the user is prompted to open the compartment to take out mail or contents if the user so desires. In this aspect, the indicium is not necessarily linked to the fastener; other arrangement are within the scope of this invention. Any suitable sensing mechanism may be used.

In the second aspect of the invention, the fastener includes means for communicating to a remote device information about the closure, the compartment or its contents. Such a remote device is preferably a computer (via email) or a mobile phone (via a text message). The invention is not limited to these possibilities and communication may take place by other means and in other forms, such as audible signals, for example.

The communication may take any desirable form. For example, in the case of a mail box, the communication may indicate that mail has been received in the mail box. If the mail carries a particular coding readable by the fastener, such as a radio frequency identification tag or a bar code, the communication may include the type of mail, and/or the identity of the sender. For example, the communication may differentiate between bills and checks. The communication can be useful to prompt the user to visit the mail box and extract mail. This can avoid the need for unnecessary visits to a mail box, only to find that the mail box is empty.

When the compartment is a locker or a mail box, the communication may be to the effect that the compartment has been tampered with. The communication can enable the user to take swift action to apprehend the person attempting or achieving unauthorised access to the compartment or, at worst, to promptly repair the closure to the compartment.

The communication may be to the effect that the contents of the compartment are dangerous, for example, explosives. The indicium (refer above) may also indicate this, for example, by pulsing a red signal.

The communication may comprise or include a acknowledgment of deposit of an article in the compartment. For example, the article may be a letter or package carrying a radio frequency identification tag or a bar code, for instance. The identifying indicia may be readable inside the compartment and convey confirmation of receipt to, for example, a central computer run by a courier company, or to a hand-held device of the courier. As another example, the identifying indicia may be read at the time of deposit by swiping it past a reader associated with the compartment and this may be independent of the fastener. Appropriate readers are known and will be apparent to one skilled in the art.

Preferably, the communication means forms part of the fastener. However, the invention is not necessarily limited to this embodiment.

Communication may take place in any suitable manner and by any suitable means.

Set out below are non-limiting examples of methods which may be suitable for communication to the fastener for access control activation. It will be appreciated by one skilled in the art that many of these methods are also suitable for communication to the remote device as to for example, information regarding the closure, the compartment or its contents.

Communication may take place by a wireless link from a hand-held terminal to the fastener, for example by a custom radio link, by "Bluetooth", by "Zigbee", by "WiFi (802.11)", by inductive coupling, by infrared, microwave or visible light, or by sound energy, such as ultra sound.

Communication may take place by wireless link from a hand-held device to an external system which then controls the fastener, for example by GPS (sms/mms), GPRS, WiFi to Internet access point, custom radio link, email or voice call to operator. Communication from the external system to the compartment may be via dial-up connection, broad band Internet. GPS, GPRS. Wifi and so on.

As other examples, communication may take place from a push button keyfob, using radio frequency communication, in a similar manner to a garage door opener or a car alarm keyfob. Another example is the entry of a code using a keypad. Communication can take place by a contact-type or contactless smart card. A magnetic strip card swipe may be used, or an optically coded card or device, for example carrying a bar code or coded perforations, etc. Communication can take place using an ID chip, similar to a microchip used on animals, being magnetically or radio frequency coupled. Biometric methods may be used, such as fingerprint scan, retina scan, optical image recognition, voice recognition, DNA scan. An RFID scan may also be used.

These examples of suitable communication can be applied to any appropriate aspect of the invention.

In the third aspect of the invention, one particular fastener is addressable via a signal provided by means external to the compartment and capable of addressing the fastener, in an array of compartments. The means external to the compartment preferably involve a smart card and a smart card reader. An authorised user of the compartment (such as a mail box or locker) is provided with an encoded smart card. When this is passed in front of an appropriate reader, or inserted in it, the reader checks the authorisation encoded in the card and addresses the appropriate fastener, providing a signal to the fastener to cause the closure to assume the second position relative to the opening (eg, to open the compartment). It will be appreciated that an array of compartments may require merely a single reader, thus saving the considerable costs of individual locks and keys to each compartment. Further, if a suitable fastener is addressable in this aspect it may be necessary to use only a single electrical wire connecting all of the fasteners in series, representing a further cost saving. It is possible to supply both power and data to each addressable fastener, which can include an embedded switch and processor. The fasteners can be addressed on an individual basis or as part of a group.

The closure of the invention can be used to log usage of the compartment, for example, via an intelligent fastener.

SUMMARY OF THE DRAWINGS

The invention will now be described in connection with certain non-limiting examples described in the attached drawings. In the drawings:

FIG. 5 is a side view of a third embodiment of a fastener;

FIG. 6 is an enlarged form of the embodiment in FIG. 5;

FIG. 7 is a rear view of the embodiment of FIG. 6;

FIG. 8 is a front view of the embodiment of FIG. 6;

FIG. 9 is a top view of the embodiment of FIG. 6;

FIG. 10 is a sectional view along the lines A-A of FIG. 8;

FIG. 11 is a sectional view along the lines B-B of FIG. 8;

FIG. 12 shows in reduced form the embodiment of FIGS. 13-18;

FIG. 13 is a side view of the embodiment of FIG. 12, designed for "intelligent" use;

FIG. 14 is a top view of the embodiment in FIG. 12;

FIG. 15 is a bottom view of the embodiment in FIG. 12;

FIG. 16 is a front view of the embodiment of FIG. 12;

FIG. 17 is a sectional view taken along the lines A-A of FIG. 16;

FIG. 18 is a sectional view taken along the lines B-B of FIG. 16;

DETAILED DESCRIPTION OF THE DRAWINGS

Figure 3:
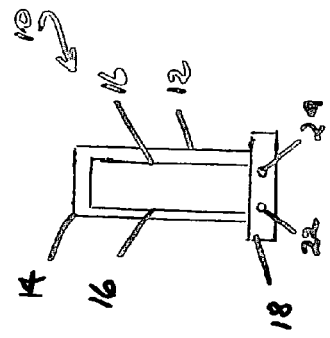
FIG. 3 shows the embodiment of FIG. 1 in rear view.
Figure 2:
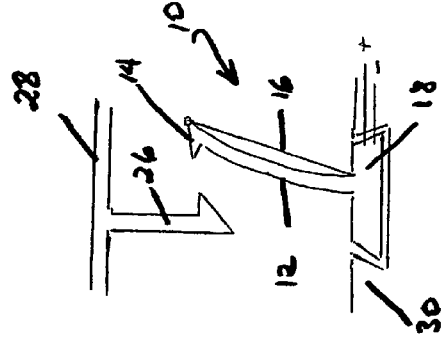
FIG. 2 shows the fastener of FIG. 1 in the released configuration.
Figure 1:
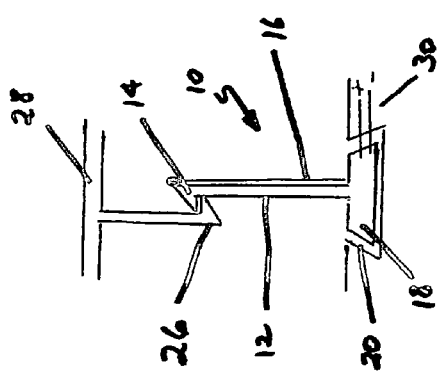
FIG. 1 shows in side view a simple form of a first embodiment of a fastener useful in association with the closure of the invention, in fixed configuration.

Referring first to FIGS. 1 to 3, the fastener indicated generally at 10 is principally made of suitable deformable material in shank 12 and hook 14. Titanium/nickel shaped memory wire 16 connects the top of hook 14 with base 18. Base 18 is shown mounted in an appropriate recess 20 retaining fastener 10 in position. Base 18 has terminals 22 and 24 connected to an electric power supply (not shown). Wire 14 may be suitably insulated to improve performance (insulation not shown).

Fastener 10 takes the form of an overhang clip which, in FIG. 1, is shown in the first position engaging clip 26 being formed integrally with element 28, base 18 of overhang clip 10 being restrained by the shape of recess 20 in another element 30.

In FIG. 2, wire 16 has been heated by the application of power via terminals 22 and 24 in base 18. Wire 16 has contracted, causing hook 14 to be drawn away from contact with hook 26. The separation between hook 14 and hook 26 is somewhat exaggerated in FIG. 2 for convenience of illustration. If wire 16 is permitted to cool, for example by suitable reduction in power being applied via terminals 22 and 24, overhang hook 10 can return to the state shown in FIG. 1 and re-engage hook 26.

Figure 4:
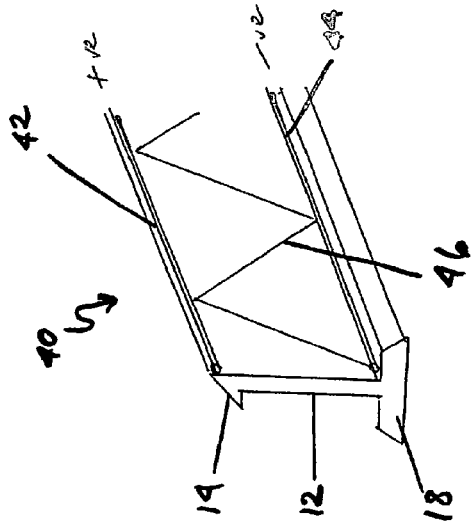
FIG. 4 shows a second embodiment of a fastener in linear form.

Turning now to FIG. 4, parts which are similar to those in FIGS. 1 to 3 carry the same numerals. In this embodiment, linear overhang hook 40 has shank 12, hook 14 and base 18. Shape memory wire (not shown) is integrated with overhang hook 40. Also included are positive and negative buses 42 and 44, connecting by metal wire lashing 46. Overhang hook 40 is especially suitable for providing a continuous form of fastener Turning now to the embodiment in FIGS. 5 to 11, once again, the same numerals will be used for similar parts as in the embodiment in FIGS. 1 to 3. Except for base 32, overhang fastener 50 is very similar to that in FIGS. 1 to 3. No shape memory wire is shown in the embodiment in FIGS. 5 to 11 but of course it is included. As may be seen from FIGS. 9 and 10, vertical holes 34 are included in base 32. Base 32 also includes horizontal cavity 36. The purpose of holes 34 and cavity 36 is to accommodate screws.

With reference now to FIGS. 12 to 18, overhang fastener 60 has shank 12 and hook 14, similarly to previous embodiments. However, base 62, which contains cut outs 64 either side of bridge 66 (refer FIG. 15) includes cavity 68 designed to receive a microprocessor or connect to a circuit board so that fastener 60 can be "addressable". A reduced scale version of fastener 60 is shown in FIG. 12.

Figure 19:
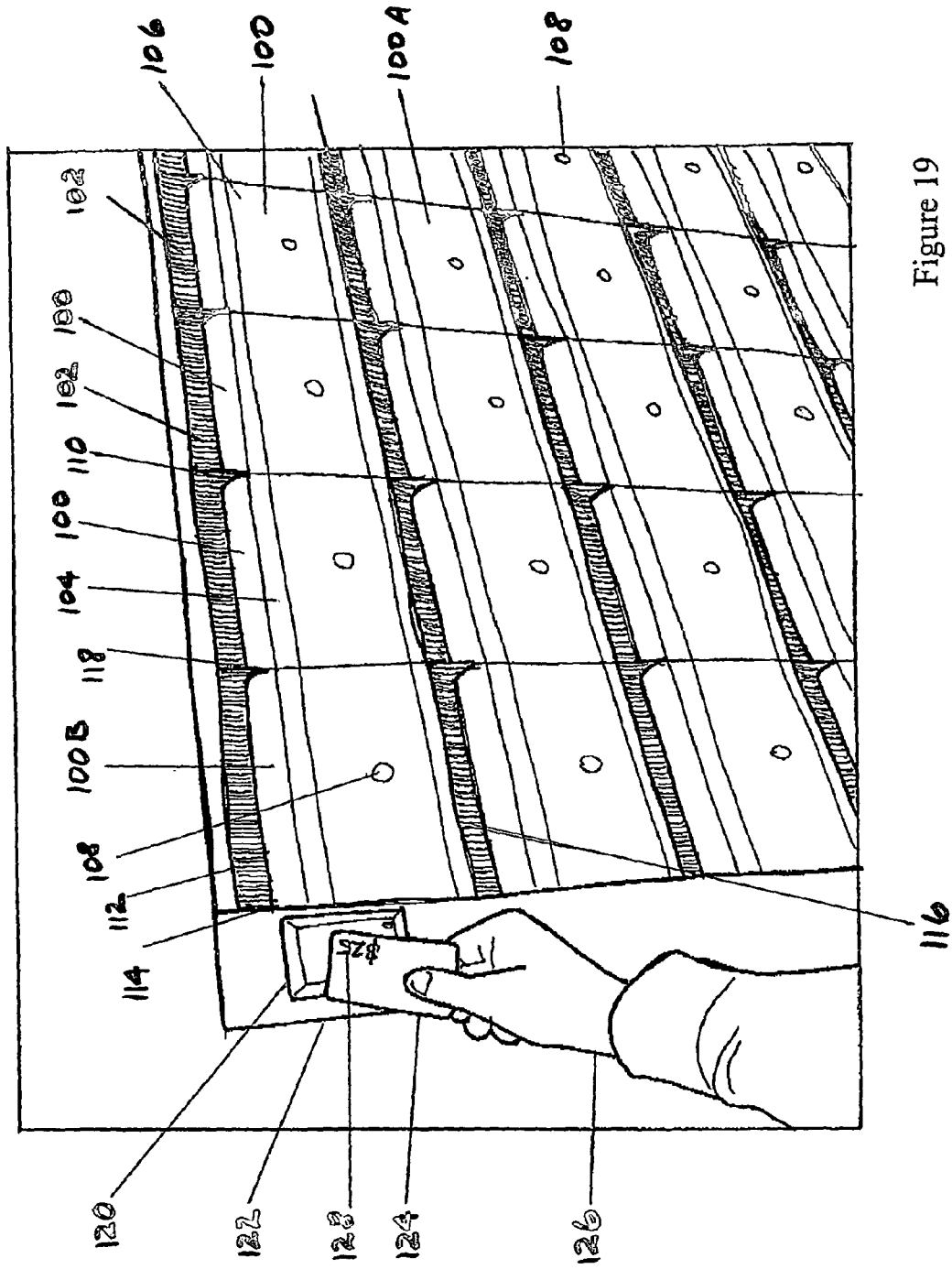
FIG. 19 shows an embodiment of an array of mail boxes capable of being operated by use of a smart card.

Turning now to FIG. 19, this shows a number of mail boxes 100 set out in a rectangular array. Each mail box 100 has a letter slot 102 and an area 104 on closure 106 for insertion of detail such as the number of the box or the name of the owner, etc. Closure 106 also includes LED 108 for indicating status of closure 106 or the compartment within. The compartment has an opening 110, of which letter slot 102 forms part. Opening 110 is defined by compartment walls 112, 114, 116 and 118. The compartment may also be defined by a rear wall (not visible in FIG. 19).

Card reader 120 is mounted on side wall 122 of the array of mail boxes 100. When a user 126 passes smart card 124 in front of card reader 120, card reader 120 reads information stored on smart card 124 and, if appropriate, addresses the fastener or fasteners (not shown) in the appropriate mail box. In this embodiment, it will be assumed that the appropriate mail box is 100A. Card reader 120 then causes an electrical current to be passed through a multi-drop communications and power feed bus connecting all the mail boxes 100. The fastener or fasteners on mail box 100A are addressed, sufficient current is applied to cause shape memory alloy in the fastener or fasteners to contract causing the fastener or fasteners to release and closure 106 to open.

LED 108 may be unlit to show that closure 106 is properly closing opening 110 on mail box 100. Alternately, LED 108 may be assigned a particular colour, such as green, when in this situation. In the case of mail box 100A, once the fastener has caused the closure to open, LED 108, connected to the fastener or fasteners, may emit a red colour to indicate that the status of mail box 100A is "open".

It should also be mentioned that LED 108 may emit a different colour, such as blue, to indicate that there is mail within mail box 100.

Smart card 124 is shown having an endorsement 128 as to a particular amount of currency. If the array of mail boxes 100 represents private mail boxes operated by a private enterprise for profit, a user may be assigned a particular mail box 100 (such as mail box 100A) and be given smart card 124 upon payment of the appropriate fee (in this case, $25.00). Smart card 124 may be programmed to expire after a particular period or once a particular date is reached. Alternately, smart card 124 may be configured so that a small fee is deducted from smart card 124 each time it is read by card reader 120. The fee may be deducted against a credit on smart card 124 or from an authorised bank account. More frequent operation of mail box 100A will use up the credit on smart card 124 more quickly. If LED 108 shows whether the compartment in mail box 100A is empty or not, unnecessary opening of mail box 100A is eliminated, thus maximising the value to be obtained from smart card 124.

Smart card 124 may have multiple uses. For example, it may be programmed to open the door of a condominium, or it may also operate as a credit card.

Figure 20:
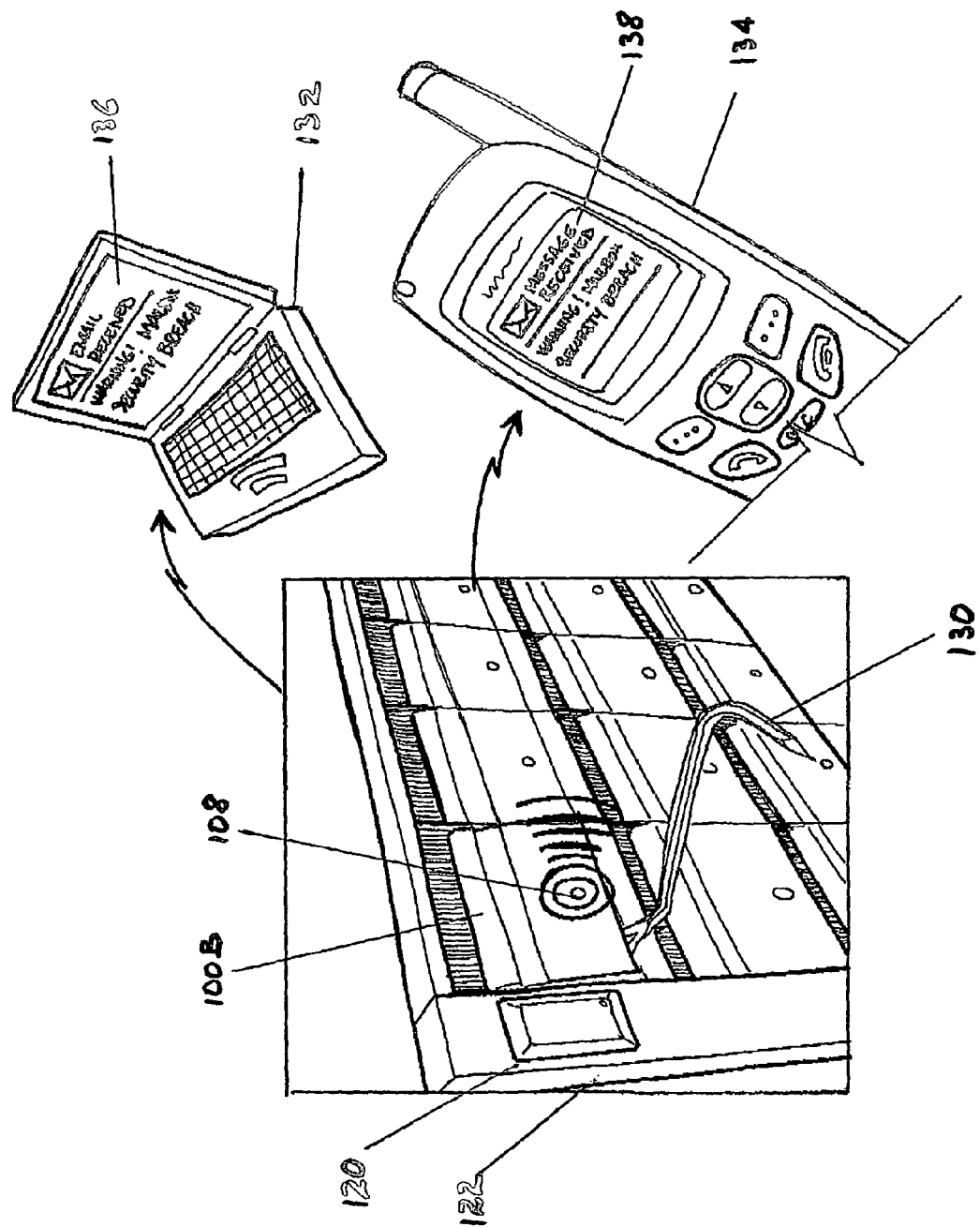
FIG. 20 shows the mail boxes of FIG. 19 with one of the mail boxes indicating visually a status of the closure and also illustrating communication with two remote devices.

With reference now to FIG. 20, where the same numerals as in FIG. 19 are used for the same parts, mail box 100B is shown with crowbar 130 inserted so as to force open closure 106. LED 108 is emitting a chosen colour, such as red, to indicate that tampering has taken place or merely that closure 106 is in the open status. At the same time, a message has been transmitted to either or both computer 132 and mobile phone 134. The signal can be sent from mail box 100B using known technology. It may be received on computer 132 via email and on mobile phone 134 via a text message. In the case of computer 132, the email is shown in display 136. In the case of mobile phone 134, the text message is shown in display 138.

Figure 21:
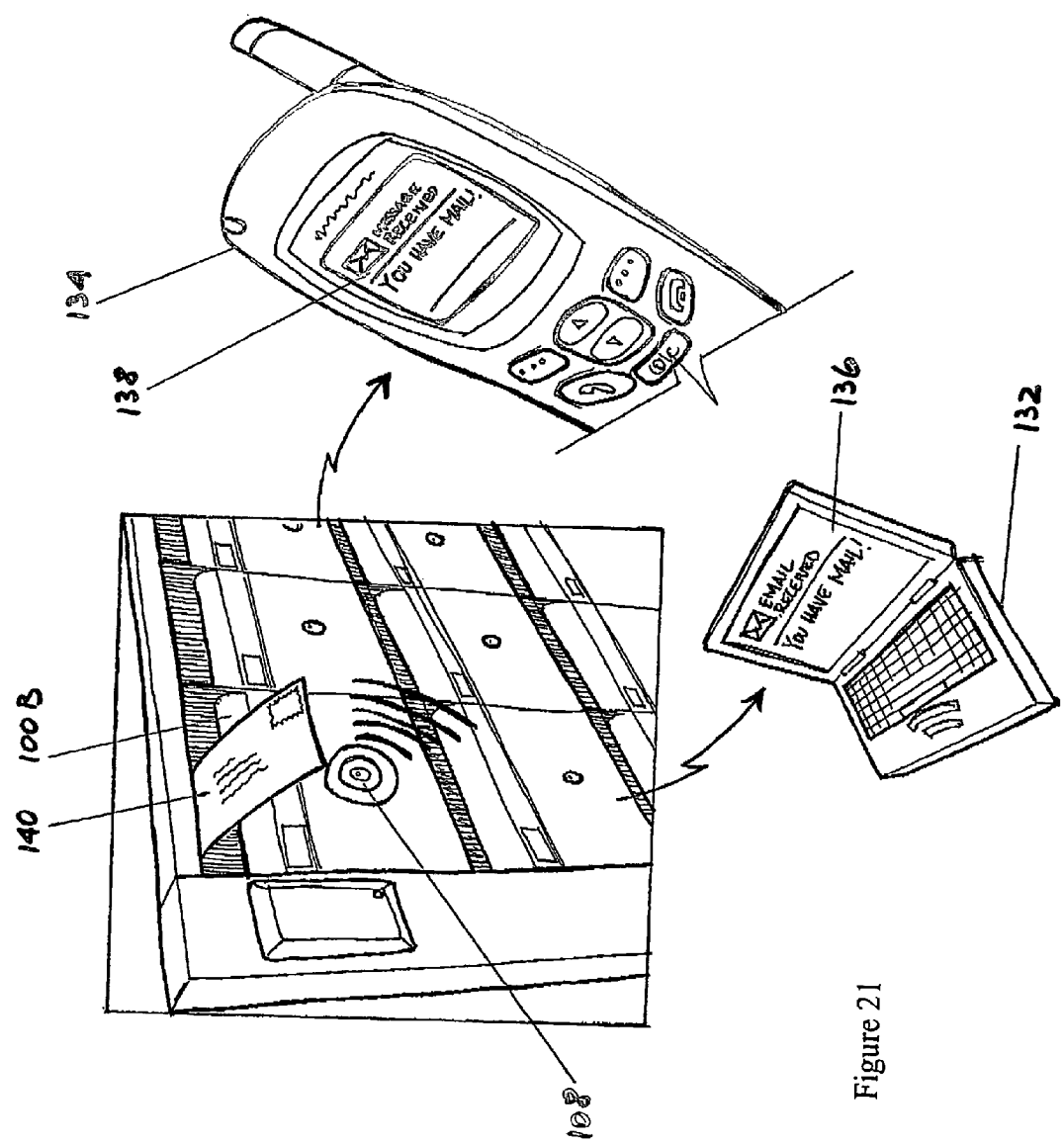
FIG. 21 is a similar view to that in FIG. 20 but illustrating a visual indication of different status and a different communication to those in FIG. 20.

In FIG. 21, the same numerals are used as in the case of FIGS. 19 and 20. In FIG. 21, mail 140 is inserted in letter slot 102, a fastener (not shown) within mail box 100B or some other means senses the presence of mail 140 and causes LED 108 to emit a chosen colour, such as blue. At the same time, LED 108 transmits a message by email to computer 132 or by a text message to mobile phone 134. Computer 132 displays the message that mail has been received on display 136. Mobile phone 134 displays a similar message on display 138.

If mail 140 carries a suitable readable tag, such as a radio frequency identification tag the nature of that mail may be messaged to computer 132 and/or mobile phone 134, as appropriate. Computer 132 may of course be a hand-held computer carried by a courier, so that the courier can receive acknowledgment of the delivery of the mail.

INDUSTRIAL APPLICABILITY

The invention in its various aspects can greatly improve efficiency and lower costs in relation to compartments, especially mail boxes and lockers. The invention can save unnecessary labour, it can save time and it can enable economic benefits in the operation of commercial mail boxes and lockers.

It will be apparent that many other versions of the invention may be devised and are within the scope of this disclosure, without departing from the spirit and scope of the invention.

The invention claimed is:

1. A closure for a compartment having one or more walls and an opening defined by at least one of the walls, the closure being associated with at least one fastener located inside the compartment and adapted to hold the closure in a first position relative to the opening, the at least one fastener comprising means for communicating to a remote device information relating to the closure, the compartment or its contents, and the at least one fastener being adapted to cause the closure to assume a second position relative to the opening upon receipt of a suitable signal, wherein the compartment forms an array with other compartments having respective closures and fasteners, the at least one fastener is addressable and the signal is provided external to the compartment and capable of addressing the at least one fastener, the signal being provided using any one of: entry of a code using a keypad; a wireless link; a radio link; induction coupling; infrared, microwave or visible light energy; sound energy; email; voice recognition; a smart card; an ID chip; a biometric scan; optical image recognition; or an RFID scan.

2. The closure of claim 1 wherein the information communicated to the remote device relates to the presence or absence of an item within the compartment.

3. The closure of claim 1, wherein the compartment is a mail box or locker having an internal opening for deposit of mail.

4. The closure of claim 1, having a slot provided at one end of or through the closure.

5. The closure of claim 1, wherein the closure is hinged to the compartment at the opening.

6. The closure of claim 1, wherein in the first position the closure closes the opening.

7. The closure of claim 6, wherein the at least one fastener located inside the compartment is adapted to hold the closure in the first position relative to the opening without input of energy.

8. The closure of claim 1, wherein in the second position the closure permits access to the opening upon receipt of the signal.

9. The closure of claim 1, wherein the closure is adapted to return to the first position from the second position by the application of pressure of the closure against the opening.

10. The closure of claim 1, the closure being associated with two or more fasteners.

11. The closure of claim 1, wherein the at least one fastener is located on the closure.

12. The closure of claim 1, wherein the at least one fastener is located on a wall of the compartment.

13. The closure of claim 1, where there is more than one fastener associated with the closure, but only one fastener is addressable.

14. The closure of claim 1, wherein the at least one fastener is encrypted.

15. The closure of claim 1, wherein the signal is provided by the smart card and the array is linked to a smart card reader for reading the smart card.

16. The closure of claim 15, wherein the smart card reader is configured to deduct a fee each time the smart card is read by the smart card reader.

17. The closure of claim 16, wherein the fee is deducted against a credit on the smart card or from a remote account.

18. The closure of claim 15, wherein the smart card is adapted to open another closure and/or to operate as a credit card.

19. The closure of claim 1, wherein in the array the fasteners are connected in series.

20. The closure of claim 1, wherein in the array each fastener is addressable on an individual basis or as part of a group.

21. The closure of claim 1, wherein the information is an identifying indicia of at least part of the contents and the remote device is a courier computer.

22. The closure of claim 21 wherein the identifying indicia is chosen from a radio frequency identification tag and a bar code.

* * * * *